United States Patent
Hoffman et al.

(10) Patent No.: US 9,304,042 B2
(45) Date of Patent: Apr. 5, 2016

(54) FOREIGN OBJECT DETECTION SYSTEM AND METHOD SUITABLE FOR SOURCE RESONATOR OF WIRELESS ENERGY TRANSFER SYSTEM

(71) Applicant: DELPHI TECHNOLOGIES, INC., Troy, MI (US)

(72) Inventors: Peter F. Hoffman, Avon, OH (US); Richard J. Boyer, Mantua, OH (US); Richard A. Henderson, Chardon, OH (US)

(73) Assignee: Delphi Technologies, Inc., Troy, MI (US)

( * ) Notice: Subject to any disclaimer, the term of this patent is extended or adjusted under 35 U.S.C. 154(b) by 553 days.

(21) Appl. No.: 13/744,618

(22) Filed: Jan. 18, 2013

(65) Prior Publication Data

US 2014/0203629 A1 Jul. 24, 2014

(51) Int. Cl.
| | |
|---|---|
| *H02G 3/00* | (2006.01) |
| *B60L 1/00* | (2006.01) |
| *B60L 3/00* | (2006.01) |
| *G01J 5/00* | (2006.01) |
| *B60L 11/18* | (2006.01) |
| *H02J 5/00* | (2006.01) |
| *G01J 5/08* | (2006.01) |
| *G01J 3/46* | (2006.01) |
| *G01J 3/50* | (2006.01) |
| *G01V 3/12* | (2006.01) |

(52) U.S. Cl.
CPC ............ *G01J 5/0022* (2013.01); *B60L 11/182* (2013.01); *B60L 11/1824* (2013.01); *B60L 11/1833* (2013.01); *B60L 11/1835* (2013.01); *G01J 3/463* (2013.01); *G01J 3/50* (2013.01); *G01J 5/0846* (2013.01); *G01J 5/0859* (2013.01);

(Continued)

(58) Field of Classification Search
CPC ........... H02J 5/005; H02J 7/025; H02J 17/00; H02J 7/0004; H02J 5/00; H02J 7/0052; H02J 7/007; H02J 13/0075; H02J 2007/0037; H02J 2007/0096; H02J 3/01; H02J 7/00; H02J 7/0013; H02J 7/0027
USPC .................................................... 307/104, 9.1
See application file for complete search history.

(56) References Cited

U.S. PATENT DOCUMENTS

| | | | | |
|---|---|---|---|---|
| 4,967,276 A | * | 10/1990 | Murakami | ............. H04N 5/265 250/330 |
| 6,954,138 B1 | * | 10/2005 | Sugiura | ................... B60R 25/00 340/426.1 |

(Continued)

FOREIGN PATENT DOCUMENTS

| | | |
|---|---|---|
| WO | 2012004092 A2 | 1/2012 |
| WO | 2012004092 A3 | 3/2012 |
| WO | 2013003527 A1 | 1/2013 |

OTHER PUBLICATIONS

International Search Report for PCT/US2013/063657 published Mar. 12, 2014.

*Primary Examiner* — Jared Fureman
*Assistant Examiner* — Esayas Yeshaw
(74) *Attorney, Agent, or Firm* — Robert J. Myers

(57) ABSTRACT

A system and method to detect a foreign object proximate to a source resonator that is part of a wireless energy transfer system. The wireless energy transfer system may be one used to wirelessly charge the batteries of an electric vehicle. Data from a visible light camera and a multiple zone temperature sensor are combined or fused to determine whether a foreign object, such a metallic object or an animal, is in the vicinity of, or in close proximity to, a source resonator. The system controls an electric current provided to the source resonator based on whether a foreign object is detected to reduce or inhibit energy emitted by the source resonator. The visible light camera may be a monochrome or color camera and the temperature sensor may be an infrared camera or a thermopile array.

8 Claims, 7 Drawing Sheets

(52) U.S. Cl.
CPC ............ *H02J 5/005* (2013.01); *B60L 2240/36* (2013.01); *B60L 2250/10* (2013.01); *B60L 2270/147* (2013.01); *G01V 3/12* (2013.01); *Y02T 10/7005* (2013.01); *Y02T 90/12* (2013.01); *Y02T 90/121* (2013.01); *Y02T 90/122* (2013.01); *Y02T 90/125* (2013.01); *Y02T 90/14* (2013.01)

(56) References Cited

U.S. PATENT DOCUMENTS

| | | | | |
|---|---|---|---|---|
| 7,164,117 B2 * | 1/2007 | Breed | ............... | B60R 21/01516 250/208.1 |
| 7,439,507 B2 * | 10/2008 | Deasy | ................... | B60Q 9/008 250/338.1 |
| 8,531,562 B2 * | 9/2013 | Schmidt | ............... | H04N 5/2254 250/370.08 |
| 8,659,408 B2 * | 2/2014 | Taylor | ................... | G06T 7/0081 340/435 |
| 8,946,938 B2 * | 2/2015 | Kesler | ................... | B60L 11/182 307/10.1 |
| 2010/0277121 A1 * | 11/2010 | Hall | ....................... | B60L 11/182 320/108 |
| 2010/0309315 A1 | 12/2010 | Hogasten et al. | | |
| 2011/0074346 A1 * | 3/2011 | Hall | ........................ | B60L 3/00 320/108 |
| 2012/0089299 A1 * | 4/2012 | Breed | ..................... | B60C 11/24 701/36 |
| 2012/0236903 A1 | 9/2012 | Rejman et al. | | |
| 2013/0314221 A1 | 11/2013 | Taylor et al. | | |
| 2014/0132207 A1 * | 5/2014 | Fisher | ................... | H02J 7/0052 320/108 |

* cited by examiner

US 9,304,042 B2

FOREIGN OBJECT DETECTION SYSTEM AND METHOD SUITABLE FOR SOURCE RESONATOR OF WIRELESS ENERGY TRANSFER SYSTEM

TECHNICAL FIELD OF INVENTION

This disclosure generally relates to foreign object detection in the vicinity of a source resonator in a wireless energy transfer system, and more particularly relates to a system and method to combine or fuse information from a visible light camera and a multiple zone temperature sensor to detect a foreign object proximate to the source resonator.

BACKGROUND OF INVENTION

Wireless energy transfer systems are known to incorporate a first resonator structure (source resonator) that includes a coil configured for transferring magnetic energy and a spaced apart second resonator structure (capture resonator) that also includes a coil configured for receiving the wirelessly transmitted magnetic energy. Such a wireless energy transfer system may be used for electrically charging an energy storage device, such as battery of an electric or hybrid vehicle. In such a system, the source resonator may be located on, or embedded into, a surface for example the floor of a garage or the surface of a parking lot, and the capture resonator may be disposed on a vehicle.

During operation of such a wireless energy transfer system, the vehicle to be charged is parked so that the capture resonator is generally aligned above the source resonator. The source resonator and capture resonator are separated by a distance that approximates a ground clearance of the vehicle which is a typical clearance between the bottom portion of the vehicle's chassis and a ground surface. In some vehicle applications, the ground clearance may be in a range from about 10 centimeters (cm) to 20 cm. In such an arrangement, the ground clearance space between the source resonator and capture resonator is typically large enough to provide room for foreign objects such as aluminum soda cans or steel tools to reside on or near the source resonator. Metallic foreign objects such as these in the vicinity of the source resonator may reduce the energy transfer efficiency of the resonators and may cause undesirable localized heating due to inductive heating of the foreign object. The space between the source resonator and capture resonator may also be large enough to allow small animals, for instance dogs or cats, to come between the resonators. Having an animal between, or in close proximity to, the resonators when the wireless energy transfer system is operating may be a cause for concern. It may be desirable to monitor the source resonator and an area around the source resonator for foreign objects and to control the wireless energy transfer system to prevent or modify system operation when a foreign object is detected.

Wireless energy transfer systems capable of detecting foreign objects have been proposed, see United States Patent Application Number 2011/074346 filed Mar. 31, 2011 by Hall et al. These wireless energy transfer systems typically rely on detecting the heating of a foreign object caused by operation of the system.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

SUMMARY OF THE INVENTION

In accordance with one embodiment of this invention, a system to detect a foreign object proximate to a source resonator is provided. The system includes a visible light camera mounted so as to have a camera field of view that includes the source resonator. The camera is configured to output image data indicative of visible light intensity detected by pixels in the camera. The camera may have more than 100,000 pixels. The system also includes a multiple zone temperature sensor mounted so as to have a sensor field of view that includes the source resonator and is similar to the camera field of view. The sensor is configured to output thermal data indicative of a zone temperature for each of the multiple zones. The multiple zone temperature sensor may have fewer than 1000 zones. The system further includes a controller configured to receive visible light image data from the camera, determine an intensity map characterized as an array of intensity data cells, designate an intensity object on an area of the intensity map, receive the thermal data from the multiple zone temperature sensor, determine a thermal map characterized as an array of thermal data cells, designate a thermal object on an area of the thermal map, detect the foreign object when the intensity object and the thermal object intersect, and control an electric current provided to the source resonator when the foreign object is detected.

The camera may be further configured to output image data indicative of visible light color and the controller may be further configured to determine a hue map characterized as an array of hue data cells, designate a hue object on an area of the hue map, and detect the foreign object when the hue object, the intensity object, and the thermal object intersect. Alternatively or in addition, the controller may be configured to determine a saturation map characterized as an array of saturation data cells, designate a saturation object on an area of the saturation map, and detect the foreign object when the saturation object, the intensity object, and the thermal object intersect.

The visible light camera and the multiple zone temperature sensor may be mounted on an underside of a vehicle. The visible light camera and the multiple zone temperature sensor may be mounted in close proximity to a capture resonator.

The system may further include a warning indicator coupled to the controller effective to generate a warning signal when the foreign object is detected.

In another embodiment of the present invention, a method to detect a foreign object proximate to a source resonator is provided. The detection is based on image data from a visible light camera mounted so as to have a camera field of view that includes the source resonator and a multiple zone temperature sensor mounted so as to have a sensor field of view that includes the source resonator and is similar to the camera field of view. The method includes the steps of:

Receiving visible light image data from the camera. The image data is indicative of visible light intensity detected by pixels in the camera.

Determining an intensity map characterized as an array of intensity data cells. Each intensity data cell has an intensity value based on an intensity characteristic of the image data detected by of one or more of the pixels.

Designating an intensity object on an area of the intensity map where a cluster of intensity data cells are present that have notable intensity values relative to a reference intensity map.

Receiving thermal data from the multiple zone temperature sensor. The thermal data includes a zone temperature value for each of the multiple zones.

Determining a thermal map characterized as an array of thermal data cells. Each thermal data cell has a temperature value based on a temperature characteristic of one or more of the multiple zones. This step may include the additional steps of determining a background temperature value based on a zone temperature value of at least one zone, determining a differential temperature value for each zone based on a difference between the background temperature value and a corresponding zone temperature value, and generating a thermal binary map based on a comparison of the differential temperature value to a differential temperature threshold value.

Designating a thermal object on an area of the thermal map where a cluster of thermal data cells are present that has notable temperature values relative to a temperature threshold.

Detecting the foreign object when the intensity object and the thermal object intersect. This step may include the additional step of determining that the detection of the foreign object persists for a time longer than a persistence time threshold.

Controlling an electric current provided to the source resonator when the foreign object is detected.

The method of detecting the foreign object proximate to the source resonator may further include the steps of:

Receiving visible light image data from the camera, wherein the image data is further indicative of visible light color detected by the pixels in the camera.

Determining a hue map characterized as an array of hue data cells. Each hue data cell has a hue value based on a hue characteristic of the image data detected by of one or more of the pixels.

Designating a hue object on an area of the hue map where a cluster of hue data cells are present that have notable hue values relative to a reference hue map.

Detecting the foreign object when the hue object, the intensity object, and the thermal object intersect.

Increasing the number of hue data cells designated as the hue object based on one or more of a hue object shape and a hue object size.

Determining a saturation map characterized as an array of saturation data cells. Each saturation data cell has a saturation value based on a saturation characteristic of the image data detected by of one or more of the pixels.

Designating a saturation object on an area of the saturation map where a cluster of saturation data cells are present that have notable saturation values relative to a reference saturation map.

Detecting the foreign object when the saturation object, the intensity object, and the thermal object intersect.

Increasing the number of saturation data cells designated as the saturation object based on one or more of a saturation object shape and a saturation object size.

Increasing the number of intensity data cells designated as the intensity object based on one or more of an intensity object shape and an intensity object size.

Increasing the number of thermal data cells designated as the thermal object based on one or more of a thermal object shape and a thermal object size.

Generating a warning signal when the foreign object is detected.

In accordance with yet another embodiment of this invention, a controller for a system configured to detect that a foreign object is proximate to a source resonator is provided. The system comprises a visible light camera mounted so as to have a camera field of view that includes the source resonator. The camera is configured to output image data indicative of visible light intensity detected by pixels in the camera. The system also includes a multiple zone temperature sensor mounted so as to have a sensor field of view that includes the source resonator and is similar to the camera field of view. The sensor is configured to output thermal data indicative of a zone temperature for each of the multiple zones. The controller is configured to receive visible light image data from the camera, determine an intensity map characterized as an array of intensity data cells, designate an intensity object on an area of the intensity map, receive the thermal data from the multiple zone temperature sensor, determine a thermal map characterized as an array of thermal data cells, designate a thermal object on an area of the thermal map, detect the foreign object when the intensity object and the thermal object intersect, and control an electric current provided to the source resonator when the foreign object is detected.

Further features and advantages of the invention will appear more clearly on a reading of the following detailed description of the preferred embodiment of the invention, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION OF INVENTION

The system described herein is configured to detect a foreign object on or near a source resonator that is part of a wireless energy transfer system. The system includes a visible light camera that is mounted to provide a camera field of view that includes the source resonator within the camera field of view. The camera is in communication with a controller that is configured to visibly identify objects that may be foreign objects based on image data from the camera. The system also includes a multiple zone temperature sensor that is mounted to provide a sensor field of view that includes the source resonator within the sensor field of view. The sensor field of view may be similar to the camera field of view. The sensor is also in communication with the controller. The controller is configured to identify thermal objects that may be foreign objects based on thermal data from the sensor. When the visible object and the thermal object intersect, that is, the controller determines that location of the visible object overlaps the location of the thermal object, the controller may determine that a foreign object is on or near the source resonator and the controller may control the electrical current supplied to the source resonator to inhibit, suspend, or reduce the energy emitted by the source resonator.

An example of a system and method to combine or fuse information from a visible light camera and a multiple zone temperature sensor to more readily detect an object proximate a vehicle is described in U.S. patent application Ser. No. 13/477,122 filed May 22, 2012 and is incorporated by reference herein.

Figure 1:
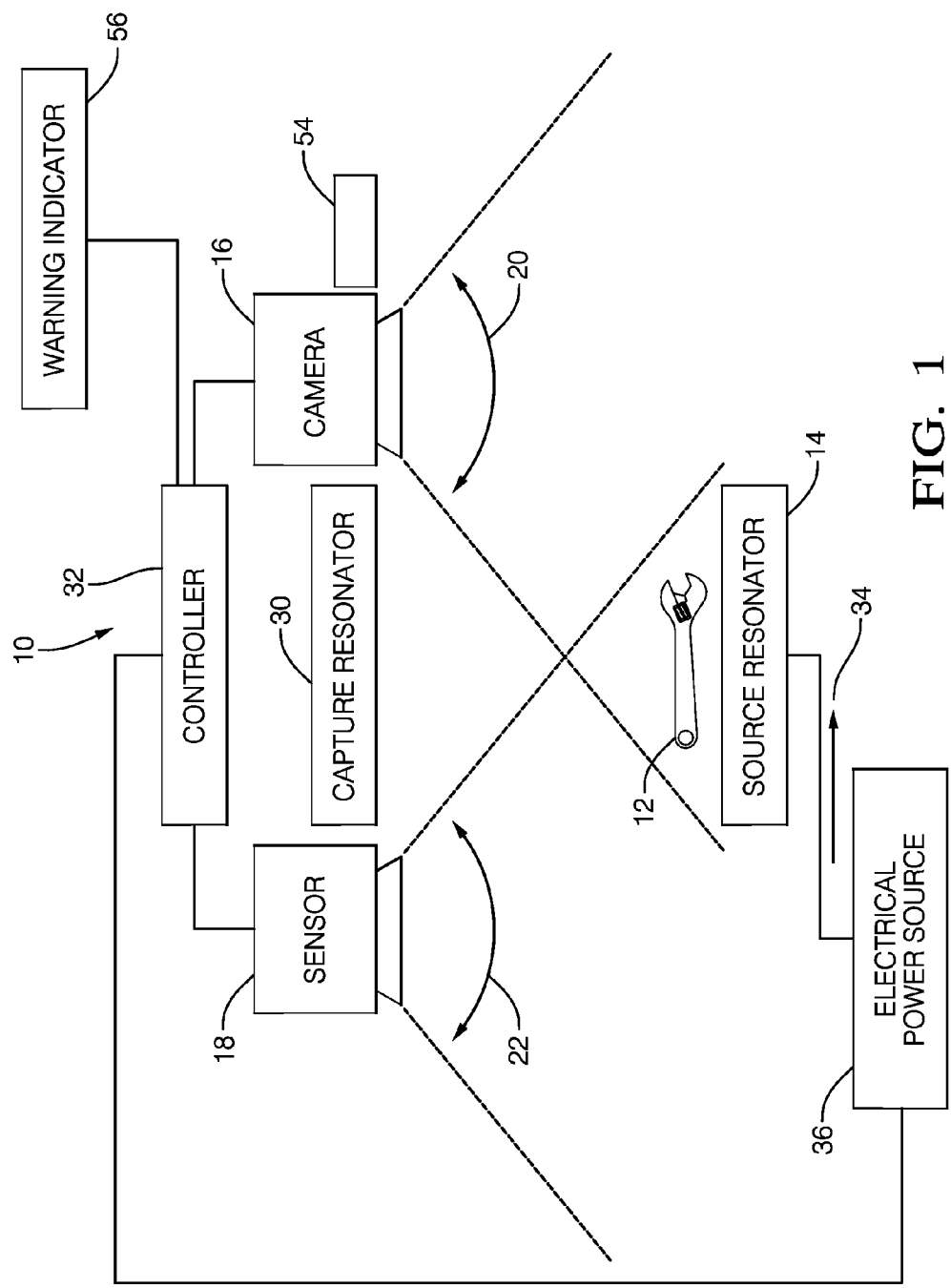
FIG. 1 is a diagram of system to detect a foreign object proximate to a source resonator in accordance with one embodiment.

FIG. 1 illustrates a non-limiting example of a system 10 generally configured to detect that a foreign object 12, for example a metallic wrench, is proximate to a source resonator 14. The system 10 includes a visible light camera 16 and a multiple zone temperature sensor 18.

As used herein, the visible light camera 16 is a digital imaging device that is most sensitive to electromagnetic energy with a wavelength in the visible light spectrum (390 nanometer (nm) to 750 nm). The visible light camera 16, hereinafter the camera 16, is generally configured to output image data indicative of visible light intensity (e.g. monochrome image data) detected by pixels (not shown) in the camera field of view 20. The camera 16 may be additionally configured to output image data indicative of visible light color, for example hue and saturation (e.g. multi-chromatic image or full color image data). A suitable resolution for the camera 16 may be provided by a pixel array characterized as 640 by 480 for a total of 307,200 pixels. Cameras of higher and lower resolution are commercially available from a wide variety of sources. The camera 16 needs to have sufficient resolution so when the image data is analyzed, there is sufficient detail to discern an object near or on the source resonator 14.

As used herein, the multiple zone temperature sensor 18 is a device that is most sensitive to electromagnetic energy with a wavelength in the infrared (IR) spectrum (750 nm to 1000 nm). The multiple zone temperature sensor 18, hereafter the sensor 18, is generally configured to output thermal data indicative of a zone temperature for each individual zone of the multiple zones in a sensor field of view 22. The individual zones may each be relatively small regions that may result in detection gaps between the individual zones, or the zones may be sized and shaped so most or all locations in the sensor field of view 22 are covered by one of the individual zones, or the zones may be sized and shaped so there is some overlap of the individual zones so some locations are covered by more than one of the individual zones. The multiple zone temperature sensor 18 may include an IR imaging camera that provides a resolution similar to that of the visible light camera 16. Alternatively, the sensor 18 may include an array of a plurality of thermopile sensors, such as those available from Heimann Sensor GmbH located in Dresden, Germany. A suitable resolution for the sensor 18 may be provided by a thermopile array of 32 by 31 thermopiles that may be configured to view 992 distinct temperature zones in the sensor field of view 22. Using such arrays of thermopile sensors instead of an IR camera may be preferred to keep the cost of the system 10 low, an important factor for automotive applications.

Figure 2:
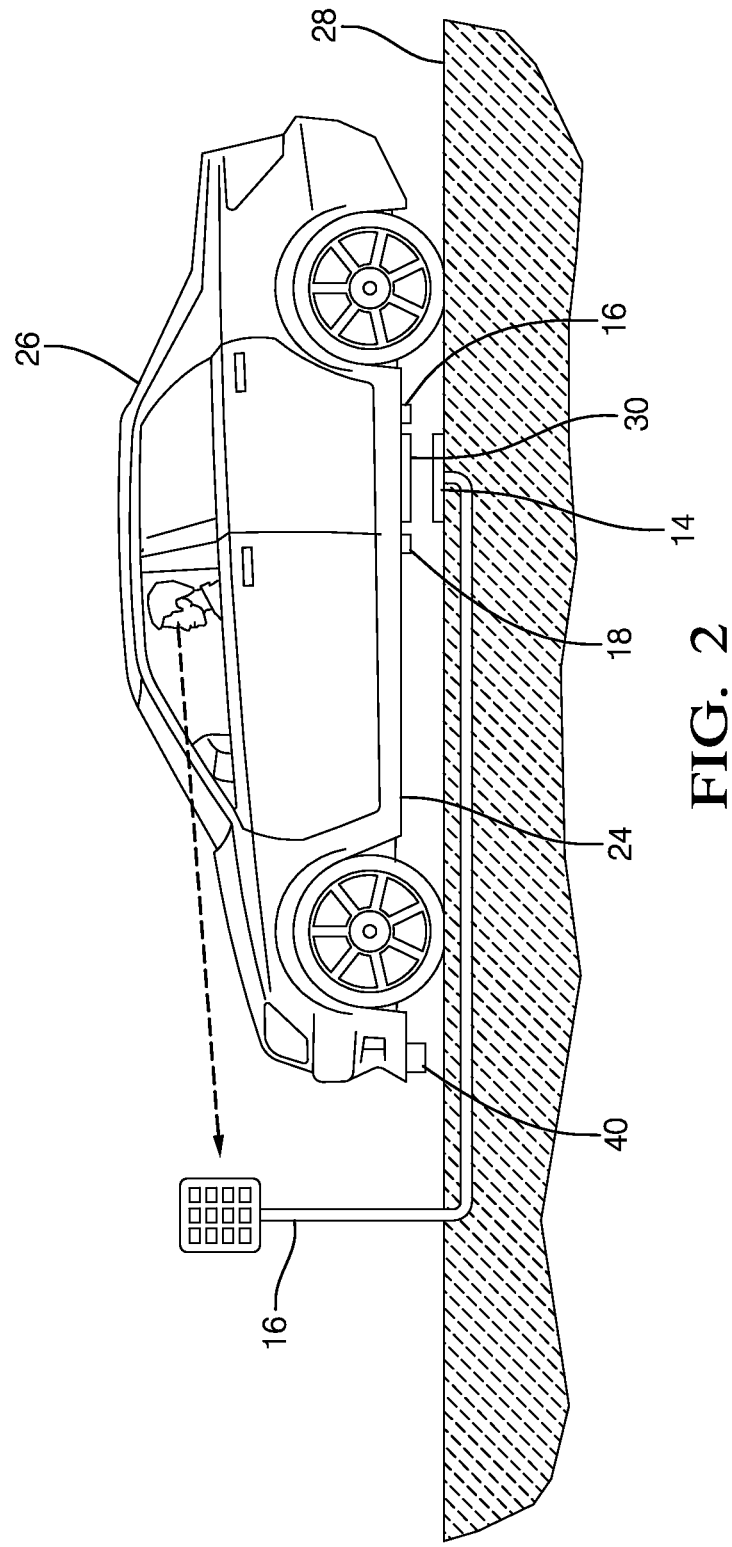
FIG. 2 is a side view of a vehicle equipped with the system of FIG. 1 in accordance with one embodiment.

In a non-limiting example shown in FIG. 2, the camera 16 and the sensor 18 are mounted on the underside 24 of the vehicle 26 in order to have a camera field of view 20 and a sensor field of view 22 that may include the source resonator 14 when the source resonator 14 in located on, or embedded in, a parking surface 28. In this non-limiting example, the camera field of view 20 is directed beneath the vehicle 26. However, it will be apparent that the system 10 could be configured with a camera 16 and a sensor 18 mounted in a location to detect a foreign object 12 when the source resonator 14 is beside or in front of the vehicle 26. In general, the sensor 18 is mounted on the underside 24 of vehicle 26 in order to have a sensor field of view 22 that may include the source resonator 14. In this example, the camera 16 and the sensor 18 are illustrated as being substantially separated only for the purpose of illustration. It is recognized that the camera 16 and the sensor 18 are preferably co-located so that both have essentially the same field of view 20, 22. As a non-limiting example, the camera 16 and sensor 18 may be located in close proximity to a capture resonator 30 in order to provide a camera field of view 20 and a sensor field of view 22 that includes the source resonator 14 when the capture resonator 30 and source resonator 14 are properly aligned for wireless energy transfer. The camera 16 and the sensor 18 may be incorporated into a single housing that also contains the capture resonator 30. If the camera 16 and sensor 18 are separated, known image processing techniques may be used to transform the apparent fields of view 20, 22 to substantially correspond. As used herein, having the sensor field of view 22 similar to the camera field of view 20 means that if the source resonator 14 is present in one field of view 20 at a location where the vehicle 26 may be over the source resonator 14, the source resonator 14 is also present in the other field of view 22.

Returning again to FIG. 1, the system 10 includes a controller 32 configured to receive the image data characterized as visible light image data from the camera 16. In general, the image data is indicative of visible light intensity of the scene in the camera field of view 20 as detected by pixels in the camera 16. The controller 32 is also configured to receive the thermal data from the sensor 18. The thermal data includes a zone temperature value for each of the multiple zones in the sensor field of view 22. The controller 32 is also configured to control an electrical current 34 supplied by an electrical power source 36 to the source resonator 14. The controller 32 may include a wireless transmitter (not shown) in communication with the electrical power source 36 in order to control the electrical current 34 to the source resonator 14.

The controller 32 may include a processor (not shown) such as a microprocessor or other control circuitry as should be evident to those skilled in the art. The controller 32 may include memory (not shown), including non-volatile memory, such as electrically erasable programmable read-only memory (EEPROM) for storing one or more software routines, threshold values and captured data values. The one or more routines may be executed by the processor to perform steps for processing signals received by the controller 32 for combining or fusing the image data and the thermal data and controlling the electrical current 34 supplied to the source resonator 14 as described herein.

Figure 3:
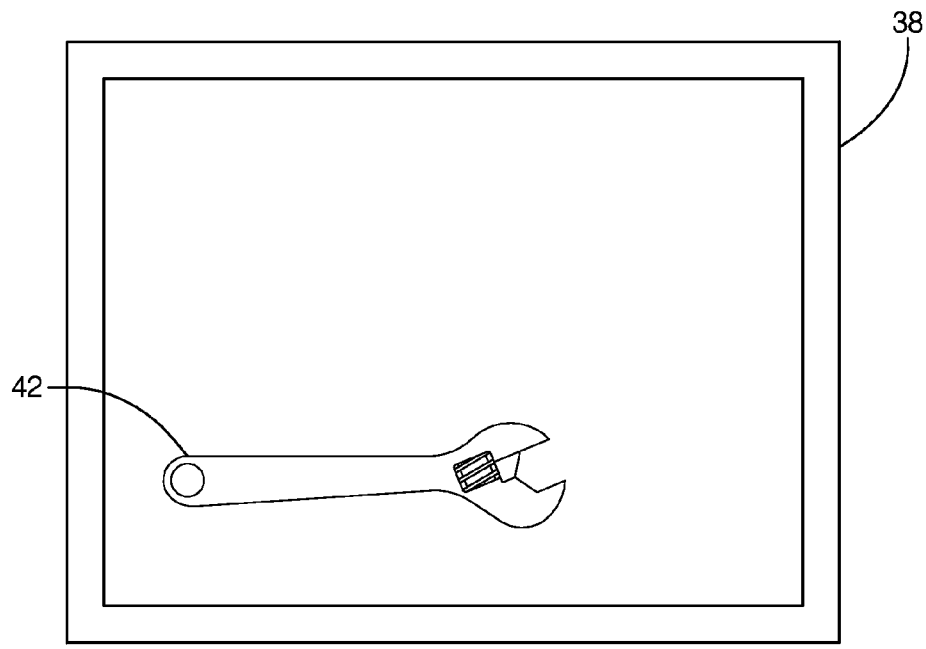
FIG. 3 is an illustration depicting an intensity map containing an intensity object of the system of FIG. 1 in accordance with one embodiment.
Figure 4:
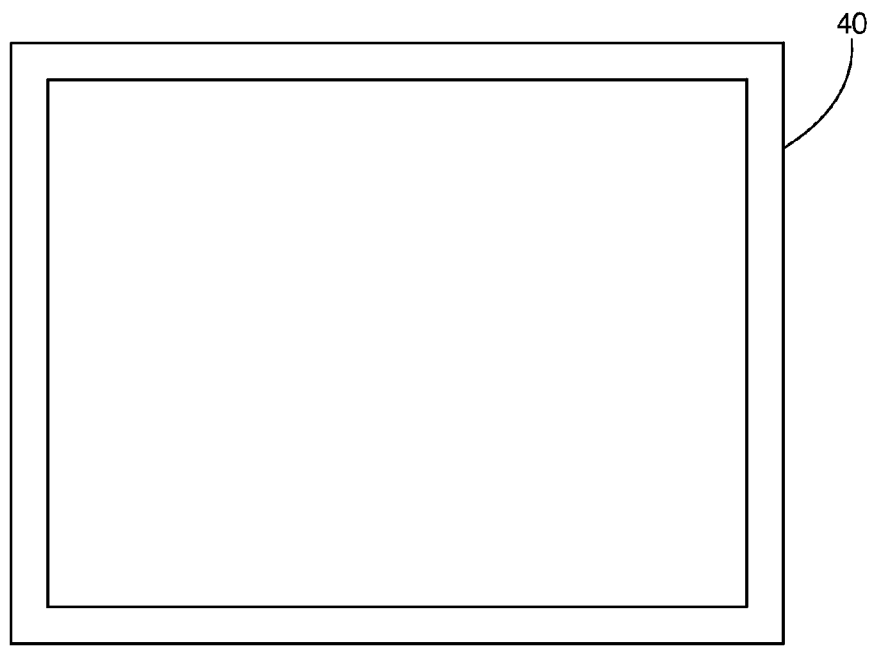
FIG. 4 is an illustration depicting a reference intensity map of the system of FIG. 1 in accordance with one embodiment.
Figure 5:
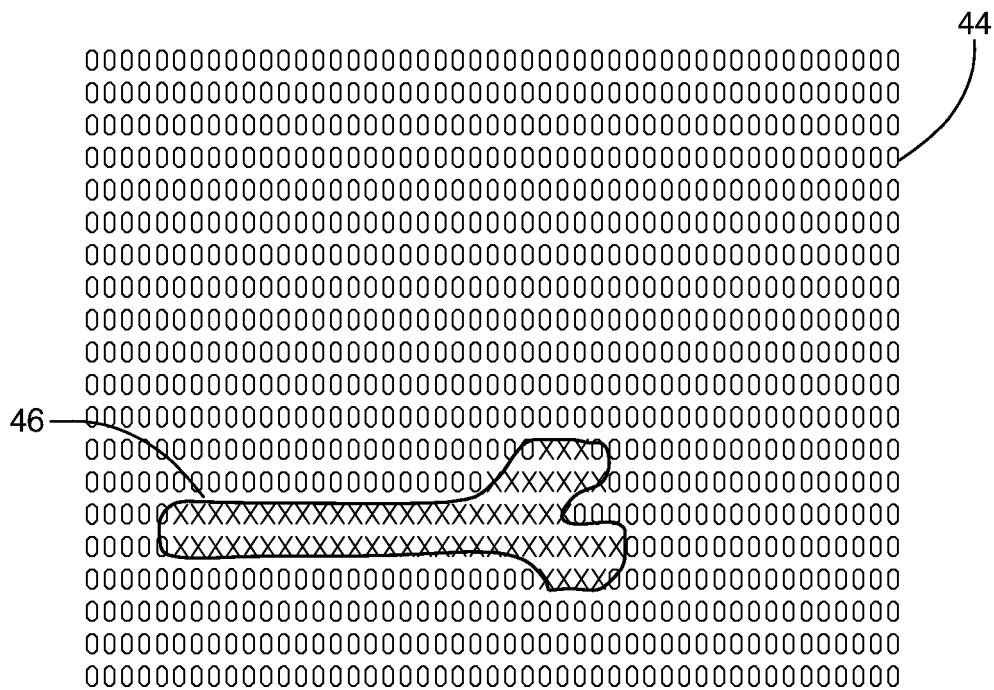
FIG. 5 is an illustration depicting a thermal map containing a thermal object of the system of FIG. 1 in accordance with one embodiment.
Figure 6:
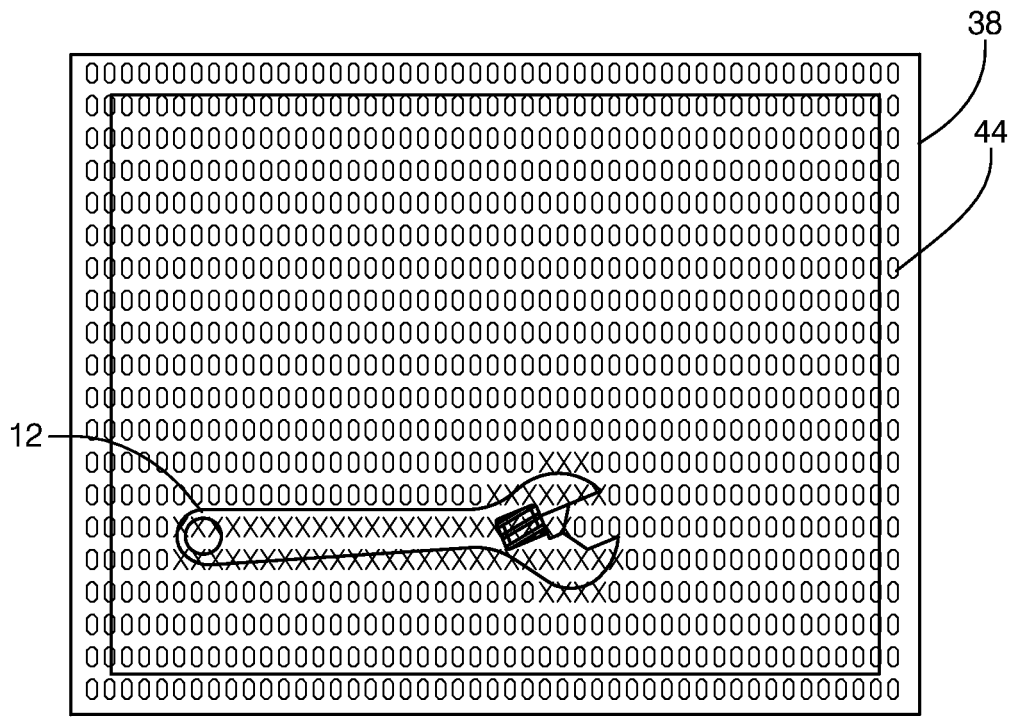
FIG. 6 is an illustration depicting the intersection of an intensity object and a thermal object of the system of FIG. 1 in accordance with one embodiment.

As will become evident in the description that follows, the image data and the thermal data are combined or fused in a way so the controller 32 can determine if a foreign object 12 in in the vicinity of the source resonator 14. In particular, the controller 32 compares an intensity map 38, as shown in FIG. 3, that is based on the intensity data from the camera 16 to a reference map 40, as shown in FIG. 4, that is based on image data of the source resonator 14 without a foreign object 12 present. If there are significant differences between the intensity map 38 and the reference map 40, the controller 32 identifies an intensity object 42, as shown in FIG. 3, that may be a foreign object 12. The controller 32 also generates a thermal map 44, as shown in FIG. 5, that is based on the thermal data from the sensor 18 and any regions in the map that exceed a thermal threshold or deviate from an expected thermal range are identified as a thermal object 46 that may be a foreign object 12. The controller 32 then compares the intensity map 38 with the thermal map 44 and when the controller 32 determines that the location of the intensity object 42 and the thermal object 46 intersect, as shown in FIG. 6, the controller 32 determines that a foreign object 12 is present.

Figure 7:
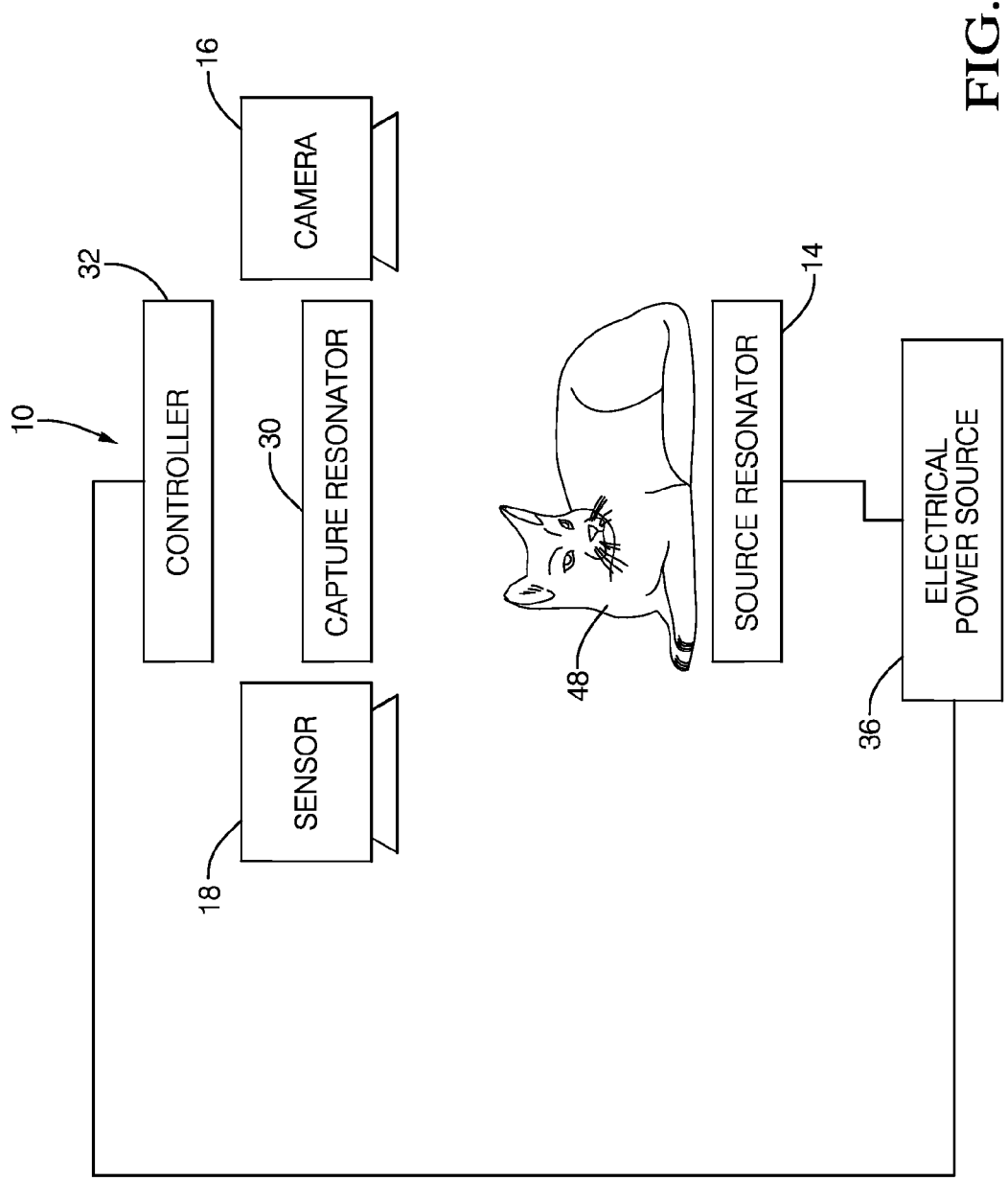
FIG. 7 is diagram depicting an animal between a source resonator and a capture resonator of the system of FIG. 1 before the source resonator initiates energy transfer in accordance with one embodiment.

As shown in FIG. 7, the controller 32 may be programmed to check for a foreign object 12 in the vicinity of the source resonator 14 before wireless energy transfer is initiated. If a foreign object 12 is thermally detected prior to the energy transfer, it is likely that the thermal object 46 detected by the sensor 18 is caused by the body heat of an animal 48 near the source resonator 14. Alternatively, if a wireless energy transfer system has been operating for a period of time the source resonator will likely be warmer than the surrounding area. The warm source resonator 14 may attract an animal 48 (such as a cat). In this case, the animal's body temperature may be lower than the temperature of the source resonator 14 and the foreign object 12 may be cooler than the thermal threshold or expected thermal range. There may also be cases wherein a metallic foreign object 12 is introduced sometime after the wireless energy transfer system has been in operation, such as a metallized gum wrapper or aluminum beverage can blown onto the source resonator by the wind. In these cases, the system 10 could detect the presence of the foreign object 12 prior to the object's self-heating due to the wireless energy transfer and the controller 32 may inhibit a wireless energy transfer by disallowing electric current 34 to be sent to the source resonator 14.

Figure 8:
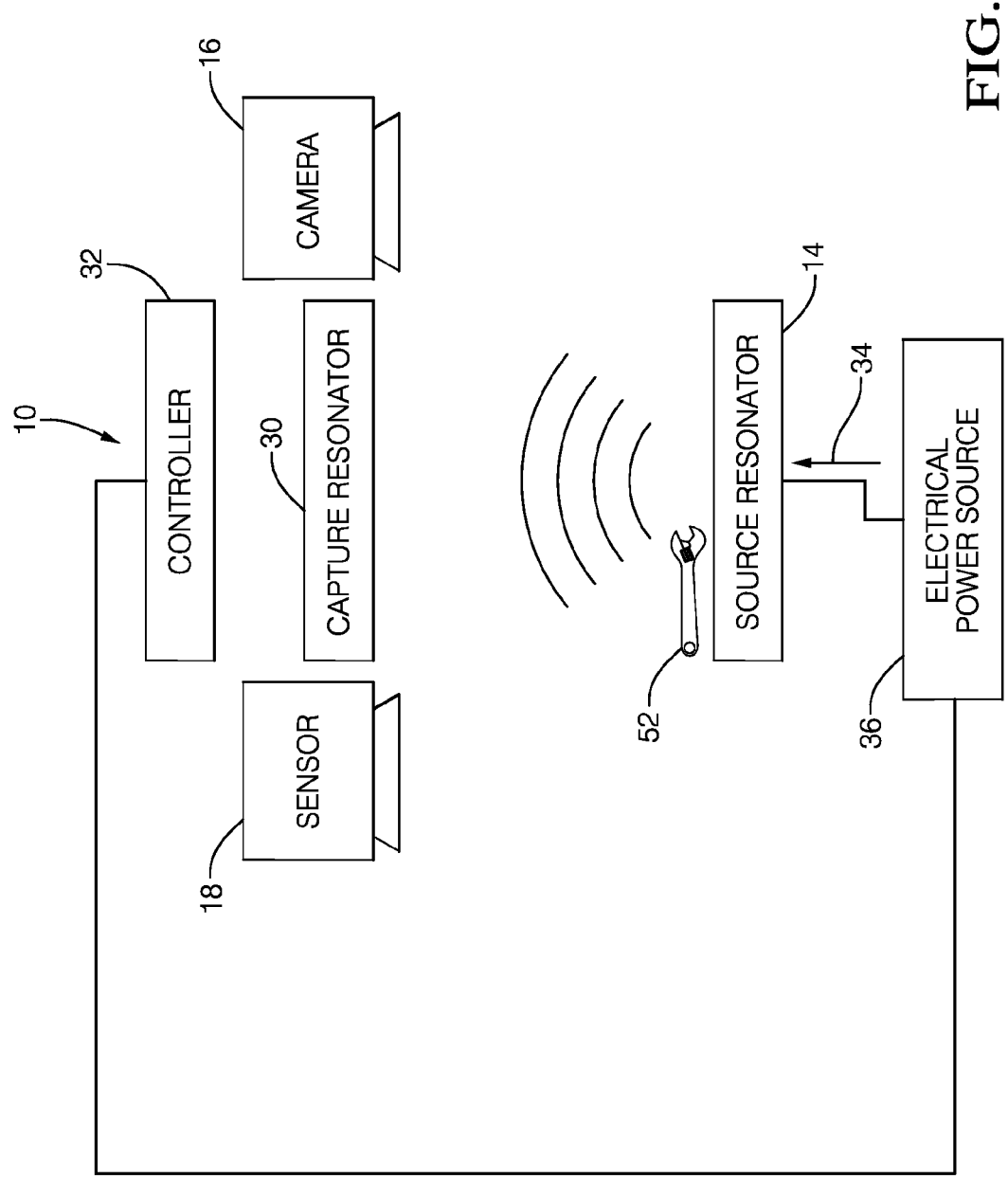
FIG. 8 is diagram depicting a metallic foreign object between a source resonator and a capture resonator of the system of FIG. 1 after the source resonator initiates energy transfer in accordance with one embodiment.

As shown in FIG. 8, the controller 32 may also be programmed to check for a foreign object 12 after wireless energy transfer is initiated. If a foreign object 12 is detected after the electrical power source 36 sends electrical current 34 to the source resonator 14 and wireless energy transfer 50 to the capture resonator 30 has started, it is likely that the thermal object 46 detected by the sensor 18 is caused by the inductive heating of a metallic object 52, for example a wrench, near the source resonator 14. In this case, the controller 32 may reduce or eliminate wireless energy transfer by reducing or eliminating the electric current 34 sent to the source resonator 14. Alternatively, if the controller 32 detects an intensity object 42 but does not detect a thermal object 46, the controller 32 may limit the current 34 supplied to the source resonator 14 in a low power mode for a predetermined time period to determine if a foreign object 12 is indeed detected. If no foreign object 12 is detected, the controller 32 may increase the current 34 supplied to the source resonator 14 to a full power mode. If a foreign object 12 is detected, the controller 32 may continue in low power mode or shut off current 34 to the source resonator 14.

By fusing image data and thermal data, the system 10 provides the advantage of detecting foreign objects 12 that generate their own heat, such as animals 48, before the wireless energy transfer system initiates energy transfer as well as foreign objects 12 that are heated by the operation of the wireless energy transfer system, such as metallic objects 52. The system 10 may also detect foreign objects 12 that are cooler than the source resonator 14 that are introduced after the wireless energy transfer system has started transferring power.

Referring once more to FIG. 1, the system 10 may include an illuminator 54 to provide additional light for the camera 16 in low light conditions (e.g. shadow beneath the vehicle 26, night time). The illuminator 54 may be an incandescent bulb, a light emitting diode (LED), a fluorescent tube, electroluminescent device, or other light emitting device well known to those skilled in the art.

If the camera 16 and sensor 18 are located on the underside 24 of a vehicle 26, the camera 16 and the sensor 18 may be subject to being obscured by road dirt collecting on the camera 16 and sensor 18 during operation of the vehicle 26. The system 10 may include a facility (not shown) to clean the camera 16 and/or the sensor 18. It is contemplated that an existing technology known to those skilled in the art could be used to clean the camera 16 and/or sensor 18, such as a nozzle directed at the camera 16 and/or sensor 18 so as to direct a stream washer fluid when required or a rotating film that could advance providing a clean field of view 20, 22.

As shown in FIG. 1, the system 10 may also include a warning indicator such as an indicator light or audible alarm. In general, the warning indicator is configured receive a warning signal from the controller 32, and in response to the warning indicator output a light, sound, or other action to attract the attention of the operator when the foreign object 12 is detected.

Figure 9:
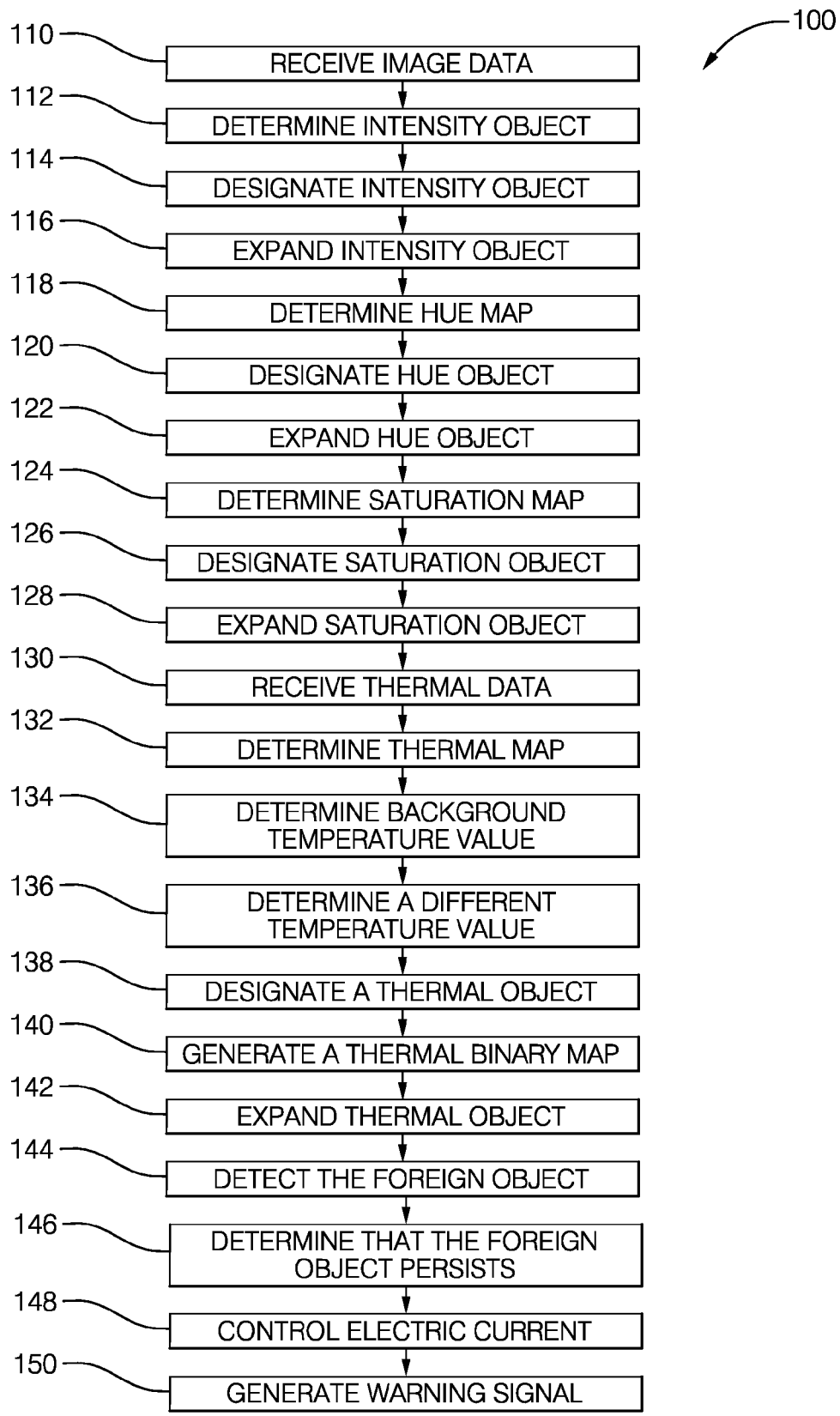
FIG. 9 is a flowchart of a method executed by the system of FIG. 1 in accordance with one embodiment.

FIG. 9 illustrates a method 100 to detect a foreign object 12 proximate to a source resonator 14. As described above, the detection is generally based on image data from a visible light camera 16 mounted on the vehicle 26 so as to have a camera field of view 20 of the source resonator 14. The detection is also based on thermal data from a multiple zone temperature sensor 18 mounted on the vehicle 26 so as to have a sensor field of view 22 similar to the camera field of view 20.

In general, and as will be explained in more detail below including by way of non-limiting examples, the system 10 seeks to detect the foreign object 12 by examining various arrays of data cells that indicate attributes such as the intensity values, hue values, and saturation values, as detected by pixels of the camera 16. If the resolution of the camera 16 is greater than is necessary to detect the object, the values stored in each data cell of the various data arrays may be based on more than one pixel. The examination of these various arrays is directed to detecting a potential foreign object 12 by comparing the data arrays to a reference array that corresponds to a view of the source resonator 14 without a foreign object 12 in the vicinity. The temperature zone data from the sensor 18 is similarly stored in arrays and is examined for instances of clusters of data wherein the temperature exceeds a threshold that may indicate the presence of a foreign object 12, either metallic or biologic. Then various combinations of these arrays or maps of the image data and the thermal data are compared, in effect 'overlaid' on one another, to look for instances where a potential foreign object 12 is present in more than one map.

Another feature of the system 10 and method 100 that will become apparent in the explanation below is that it was recognized that potential misalignment between the camera field of view 20 and the sensor field of view 22 may cause smaller objects to go undetected. This is because when the arrays or maps are logically overlaid, and the two fields of view 20, 22 are misaligned, potential objects in the camera data based image maps may not coincide in location with potential objects in the sensor data based thermal maps. To address this problem, the apparent size of potential objects may be increased or 'expanded' as described below to increase the chance of a potential object being confirmed or promoted to a detected object status because there is an intersection of the potential objects when the maps are overlaid.

Referring now to FIG. 9, step 110, RECEIVE IMAGE DATA, includes receiving visible light image data from the camera 16. In general, the image data includes data indicative of the visible light intensity (denotes the brightness of the light) detected by pixels in the camera 16. This may correspond to the image data output from a monochromatic camera, or the image data may further include data indicative of the color of the visible light, for example hue (denotes the degree or dominant wavelength of a measured color) and/or saturation (denotes the amount of color contained compared to white light). This may correspond to the image data output from a color camera.

Step 112, DETERMINE INTENSITY MAP, includes determining an intensity map 38 characterized as an array of intensity data cells, wherein each intensity data cell has an intensity value based on an intensity characteristic of the image data detected by of one or more of the pixels. By way of example and not limitation, the intensity value may be expressed as a number between zero (0) and two hundred fifty five (255) (equivalent to 0 and FF hexadecimal) to indicate a relative value, or the intensity value may be expressed as a number corresponding to a particular unit of intensity measure per unit area such as luminance in lumens per square centimeter.

Step 114, DESIGNATE INTENSITY OBJECT, includes designating an intensity object 42 on an area of the intensity map 38 where a cluster of intensity data cells are present that have notable intensity values relative to a reference intensity map 40. The intensity object 42 is determined based on a cluster of intensity data cells having intensity values that differ from the intensity values of a corresponding portion of the reference intensity map 40. According to a non-limiting example, the reference intensity map 40 may be stored in the memory of the controller 32 and may be an intensity map 38 of a field of view of a source resonator 14 that does not have any foreign objects 12 present. The reference intensity map 40 may correspond to a typical source resonator 14 or the reference intensity map 40 may correspond to a particular source resonator 14. The controller 32 may determine the particular source resonator 14 reference intensity map 40 by communicating with the wireless energy transfer system. The controller 32 may store a reference intensity map 40 of each particular source resonator 14 each time there is no foreign object 12 is detected.

Step 116, EXPAND INTENSITY OBJECT, is an optional step that includes increasing the number of intensity data cells designated as the intensity object 42 based on one or more of an intensity object 42 shape and an intensity object 42 size. As described above, expanding the number of data cells associated with a potential object helps to avoid a failure to detect small objects because of misalignment of the camera field of view 20 and the sensor field of view 22. As suggested above and as will become apparent in the further description that follows, if an object is small and the fields of view 20, 22 are misaligned, there is a risk that no intersection of image data based cells and thermal data based cells will occur. As such, the percentage or degree of expansion will typically be greater for small potential objects as compared to large potential objects. A way to accomplish this is to change the intensity values of data cells on the intensity map 38 proximate to and outside the intensity object 42 to a data cell value that corresponds to that of the intensity object 42.

Step 118, DETERMINE HUE MAP, is an optional step that includes determining a hue map characterized as an array of hue data cells. These data cells may be locations in memory within the controller 32. In general, each hue data cell has a hue value based on a hue characteristic of a portion of the image data detected by of one or more of the pixels in the camera 16 corresponding to the portion of camera field of view 20. By way of example and not limitation, the hue value may be a number between zero (0) and three hundred sixty (360) where zero is used to designate red, one hundred twenty (120) is used to designate green, two hundred forty (240) is used to designate blue, three hundred sixty (360) is used to designate violet, and other intermediate values are used to designate colors of the color spectrum as is well known.

Step 120, DESIGNATE HUE OBJECT, is an optional step that includes designating a hue object on an area of the hue map where a cluster of hue data cells are present that have notable hue values relative to a hue threshold and may depict a potential object having a notable size and shape. For example, a hue object may be designated because a cluster of hue data cells have a hue value notably different than surrounding hue values. Alternatively, a hue object may be designated only on the basis of the hue value and regardless of how a particular hue value differs from a perceived background. For example, a hue object may be designated simply because the hue values of a cluster of hue data cells is less than 20 and so is substantially red. It should be appreciated that the specific thresholds are determined based on the area covered by the camera field of view 20, the resolution or number of pixels of the camera 16, and many other considerations including empirical testing, as will be recognized by those in the art.

Step 122, EXPAND HUE OBJECT, is an optional step that includes increasing the number of hue data cells designated as part of the hue object based on one or more of a hue object shape and a hue object size. It should be appreciated that an expanded hue object may be comparable to the expanded intensity object of Step 116, and that the advantage of expanding the hue object is the same as the intensity object, that being reducing the risk of failing to have an intensity object 42 intersect with a portion of the thermal object 46 described below.

Step 124, DETERMINE SATURATION MAP, is an optional step that includes determining a saturation map characterized as an array of saturation data cells, wherein each saturation data cell has a saturation value based on a saturation characteristic of the image data detected by of one or more of the pixels. By way of example and not limitation, the saturation value may be indicated by a number between zero (0) and one hundred (100) corresponding to a percentage of color saturation detected by the corresponding pixel in the camera 16.

Step 126, DESIGNATE SATURATION OBJECT, is an optional step that includes designating a saturation object on an area of the saturation map where a cluster of saturation data cells are present that have notable saturation values relative to a saturation threshold. Similar to determining the hue object, the saturation object may be determined based on a cluster of saturation data cells having saturation values that stand in distinct contrast to the saturation values associated with the surrounding background.

Step 128, EXPAND SATURATION OBJECT, like the other expand steps, is an optional step that includes increasing the number of saturation data cells designated as part of the saturation object based on one or more of a saturation object shape and a saturation object size. It should be appreciated that an expanded saturation object may be comparable to the expanded intensity object of Step 116, and that the advantage of expanding the saturation object is the same as the intensity object, that being reducing the risk of failing to have a saturation object intersect with a portion of the thermal object 46 described below.

Step 130, RECEIVE THERMAL DATA, includes receiving thermal data from the multiple zone temperature sensor 18 (the sensor 18), wherein said thermal data includes a zone temperature value for each of the multiple zones. FIG. 5 illustrates a non-limiting example of temperature values detected by a thermopile array. It is understood that the zone temperature values would correspond to an actual temperature; however, for the purpose of simplifying the illustration, the thermopiles directed to areas corresponding to the source resonator 14 are labeled as '0', the thermopiles directed to areas corresponding to the thermal object 46 are labeled as 'X'.

Step 132, DETERMINE THERMAL MAP, includes determining a thermal map 44 characterized as an array of thermal data cells, wherein each thermal data cell has a temperature value based on a temperature characteristic of one or more of the multiple zones.

Step 134, DETERMINE BACKGROUND TEMPERATURE VALUE, is an optional step that includes determining a background temperature value based on the zone temperature value of at least one zone, or the average value of several selected zones, or based on an average value of all the temperature zones.

Step 136, DETERMINE DIFFERENTIAL TEMPERATURE VALUE, is an optional step that includes determining a differential temperature value for each zone may be based on a difference between the background temperature value and the corresponding zone temperature value.

Step 140, DESIGNATE THERMAL OBJECT, includes designating a thermal object 46 on an area of the thermal map 44 where a cluster of thermal data cells are present that have notable temperature values relative to a temperature threshold. The temperature threshold used may be different before the wireless energy transfer is initiated in order to detect a biologic foreign object 12 than the temperature threshold used after wireless energy transfer is initiated in order to detect a metallic foreign object 12.

Step 138, GENERATE A THERMAL BINARY MAP, is an optional step that includes generating a thermal binary map by converting the thermal data into a thermal binary map based on a comparison of the differential temperature value to a differential temperature threshold value.

Step 142, EXPAND THERMAL OBJECT, like the other expand steps, is an optional step that includes increasing the number of thermal data cells designated as the thermal object 46 based on one or more of a thermal object 46 shape and a thermal object 46 size. It should be appreciated that an expanded thermal object may be comparable to the expanded intensity object of Step 116; however the expanded thermal object may still have the highly pixelated shape shown in FIG. 5, or other image processing may be used to give the expanded thermal object a more rounded, smooth shape. As before, the advantage of expanding the thermal object 46 is the same as the intensity object 42, that being reducing the risk of failing to have the thermal object 46 intersect with a portion of the intensity object 42 (or hue object or saturation object) described above.

Step 144, DETECT FOREIGN OBJECT, includes designating a detected foreign object 12 on an area of an object map where the intensity object 42 and the thermal object 46 intersect, where the hue object, the intensity object 42, and the thermal object 46 intersect, or where the saturation object, the intensity object 42, and the thermal object 46 intersect. FIG. 6 illustrates a non-limiting example of the detecting the foreign object 12 at the intersection of the intensity object 42 and the thermal object 46.

Step 146, DETERMINE THAT THE FOREIGN OBJECT PERSISTS, is an optional step that includes other tests such as determining that the detected object persists for a time longer than a persistence time threshold, for example more than 0.1 seconds, or more than three frames when the image frame rate is thirty frames per second. This step may help reduce false detection of foreign objects 12.

Step 148, CONTROL ELECTRIC CURRENT, includes controlling an electric current 34 provided by an electrical power source 36 to the source resonator 14 when a foreign object 12 is detected. As a non-limiting example, the controller 32 may command the electrical power source 36 to reduce or suspend the current 34 supplied to the source resonator 14 when a foreign object 12 is detected.

Step 150, GENERATE WARNING SIGNAL, is an optional step that includes the controller 32 generating or outputting a warning signal when the foreign object 12 is detected or confirmed. Non-limiting examples of a warning signal may be an indicator light on the instrument panel of the vehicle 26, an indicator light on the electrical power source 36 of the wireless energy transfer system, or an audible alarm.

Accordingly, a system 10, a controller 32 for the system 10 and a method 100 to detect a foreign object 12 proximate to a source resonator 14 of a wireless energy transfer system is provided. The system 10 merges information from a visible light camera 16 and a multiple zone temperature sensor 18 to improve foreign object 12 detection and detect both biologic foreign objects 12 (animals 48) and metallic foreign objects 12 on or near the source resonator 14 that may interfere with the efficient operation of the wireless energy transfer system or may damage the system. Furthermore, potential foreign objects 12 detected by the camera 16 and/or the sensor 18 may be expanded to increase the likelihood that data maps of the expanded potential objects will be more likely to have intersecting potential objects and thereby reduce the risk of failing to detect an foreign object 12 due to misalignment of the camera and sensor fields of view 20, 22.

While this invention has been described in terms of the preferred embodiments thereof, it is not intended to be so limited, but rather only to the extent set forth in the claims that follow. Moreover, the use of the terms first, second, etc. does not denote any order of importance, but rather the terms first, second, etc. are used to distinguish one element from another. Furthermore, the use of the terms a, an, etc. do not denote a limitation of quantity, but rather denote the presence of at least one of the referenced items.

We claim:

1. A system to detect a foreign object proximate to a source resonator, said system comprising:
a visible light camera mounted so as to have a camera field of view that includes the source resonator, and configured to output image data indicative of visible light intensity detected by pixels in the camera;
a multiple zone temperature sensor mounted so as to have a sensor field of view that includes the source resonator and is similar to the camera field of view, and configured to output thermal data indicative of a zone temperature for each of the multiple zones; and a controller in communication with the visible light camera and the multiple zone temperature sensor and configured to receive visible light image data from the camera;

determine an intensity map characterized as an array of intensity data cells;

designate an intensity object on an area of the intensity map;

receive the thermal data from the multiple zone temperature sensor;

determine a thermal map characterized as an array of thermal data cells;

designate a thermal object on an area of the thermal map;

detect the foreign object when the intensity object and the thermal object intersect; and control an electric current provided to the source resonator when the foreign object is detected.

2. The system in accordance with claim 1, wherein the camera is further configured to output image data indicative of visible light color and wherein the controller is further configured to determine a hue map characterized as an array of hue data cells;

designate a hue object on an area of the hue map; and detect the foreign object when the hue object, the intensity object, and the thermal object intersect.

3. The system in accordance with claim 1, wherein the camera is further configured to output image data indicative of visible light color and wherein the controller is further configured to determine a saturation map characterized as an array of saturation data cells;

designate a saturation object on an area of the saturation map; and detect the foreign object when the saturation object, the intensity object, and the thermal object intersect.

4. The system in accordance with claim 1, said system further comprising a warning indicator coupled to the controller effective to generate a warning signal when the foreign object is detected.

5. The system in accordance with claim 1, wherein the visible light camera and the multiple zone temperature sensor are mounted on an underside of a vehicle.

6. The system in accordance with claim 5, wherein the visible light camera and the multiple zone temperature sensor are mounted in close proximity to a capture resonator.

7. The system in accordance with claim 1, wherein the camera has more than 100,000 pixels, and the multiple zone temperature sensor has fewer than 1000 zones.

8. A controller for a system configured to detect that a foreign object is proximate to a source resonator, said system comprising a visible light camera mounted so as to have a camera field of view that includes the source resonator, and configured to output image data indicative of visible light intensity detected by pixels in the camera, and a multiple zone temperature sensor mounted so as to have a sensor field of view that includes the source resonator and is similar to the camera field of view, and configured to output thermal data indicative of a zone temperature for each of the multiple zones, said controller configured to receive visible light image data from the camera;

determine an intensity map characterized as an array of intensity data cells;

designate an intensity object on an area of the intensity map;

receive the thermal data from the multiple zone temperature sensor;

determine a thermal map characterized as an array of thermal data cells;

designate a thermal object on an area of the thermal map;

detect the foreign object when the intensity object and the thermal object intersect; and control an electric current provided to the source resonator when the foreign object is detected.

* * * * *